United States Patent
Noritake (10) Patent No.: US 8,290,339 B2
(45) Date of Patent: Oct. 16, 2012

(54) VIDEO PROCESSING APPARATUS

(75) Inventor: Toshiya Noritake, Osaka (JP)

(73) Assignee: Panasonic Corporation, Osaka (JP)

( * ) Notice: Subject to any disclaimer, the term of this patent is extended or adjusted under 35 U.S.C. 154(b) by 286 days.

(21) Appl. No.: 12/850,690

(22) Filed: Aug. 5, 2010

(65) Prior Publication Data
US 2011/0038596 A1      Feb. 17, 2011

(30) Foreign Application Priority Data
Aug. 6, 2009 (JP) ................. 2009-182999

(51) Int. Cl.
*H04N 5/92* (2006.01)

(52) U.S. Cl. ........................ 386/244; 386/302

(58) Field of Classification Search .............. None
See application file for complete search history.

(56) References Cited

U.S. PATENT DOCUMENTS

| | | | |
|---|---|---|---|
| 5,489,947 A | 2/1996 | Cooper | |
| 6,144,412 A | 11/2000 | Hirano et al. | |
| 2005/0134737 A1* | 6/2005 | Honma | 348/569 |
| 2006/0056716 A1 | 3/2006 | Komeno | |

FOREIGN PATENT DOCUMENTS

| | | |
|---|---|---|
| JP | 10-501942 | 2/1998 |
| JP | 10-126748 | 5/1998 |
| JP | 2002-094996 | 3/2002 |
| JP | 2002-536856 | 10/2002 |
| WO | 00/45362 | 8/2000 |
| WO | 2004/091198 A1 | 10/2004 |

OTHER PUBLICATIONS

Notice of Reasons for Rejection for corresponding Japanese Application No. 2010-176335 issued Feb. 7, 2012.

* cited by examiner

*Primary Examiner* — Huy T Nguyen
(74) *Attorney, Agent, or Firm* — Renner, Otto, Boisselle & Sklar, LLP (57) ABSTRACT

Color difference signals of demodulated video are vertically filtered to be converted into 4:2:2 signals before subjected to OSD synthesis, after which those signals are once again vertically filtered as a sort of scaling to obtain the output resolution. As filtering is carried out in two stages, the frequency characteristic deteriorates. A video processor superimposes an OSD video signal on a 4:2:0 format video signal, and includes: a converting section for converting the OSD video signal into YUV signals; an OSD luminance signal scaling section for performing scaling on an OSD luminance signal included in the YUV signals; a luminance signal synthesizing section for synthesizing the scaled OSD luminance signal and the luminance signal of the 4:2:0 format video signal; an OSD color difference signal scaling section for performing scaling on OSD color difference signals included in the YUV signals; and a color difference signal synthesizing section for synthesizing the scaled OSD color difference signals and the color difference components of the 4:2:0 format video signal.

4 Claims, 7 Drawing Sheets

VIDEO PROCESSING APPARATUS

TECHNICAL FIELD

The present invention relates to video processing technologies for viewing and listening to, recording and/or playing back a digital broadcast. The present invention also relates to video processing technologies that can be used in a device for playing back a moving picture that has been recorded on a digital storage medium such as a BD or a DVD.

BACKGROUND ART

When a digital broadcast recorded or a content stored on a BD or a DVD is played back, subtitles, running commentaries, or the like sometimes appears on the screen. In the following description, subtitles will be used as a typical example of those various types of text information. In that case, the video device has generated an output image so that graphics representing the subtitles are superimposed on a video signal.

The video signal representing the digital broadcast received or the content stored on a BD or a DVD may have been subjected to a 4:2:0 sampling and then compressed and encoded compliant with one of the MPEG standards.

As used herein, the "4:2:0 sampling" refers to a technique for generating color difference signals (including Cb and Cr signals) at a rate that is a half as high as a luminance signal (Y) both horizontally (i.e., along the scan lines) and vertically with respect to the video on the screen. For example, take a matrix consisting of four pixels (i.e., two vertical pixels by two horizontal pixels) as an example. In that case, the luminance signal (Y) is generated for each of the four pixels, while the color difference signal (which may be either the Cb signal or the Cr signal) is generated for only a representative one of the four pixels. A video signal that has been subjected to such 4:2:0 sampling will be also referred to herein as a "4:2:0 format video signal".

The player usually demodulates the compressed video signal, generates graphics data representing the subtitles as an OSD (on screen display) plane video signal (which will be referred to herein as an "OSD video signal"), and then synthesizes together the video signal and the OSD video signal in accordance with their degree of transparency information to carry out rendering. This synthesis process is performed after the video color difference signals are subjected to vertical filtering and transformed into color difference signals (which are signals in either 4:2:2 format or 4:4:4 format) that have the same phase (which will be referred to herein as "vertical phase" or "sampling phase") as the video luminance signal (see patent document 1, for example).

To get the given synthetic video signal matched to the resolution of a display device connected, a player performs scaling processing on the synthetic video signal and then outputs the processed signal to the display device. As this scaling processing, IP (interlace/progressive) conversion is sometimes carried out. When the IP conversion is performed, the color difference signals of the synthetic video signal are also subjected to the vertical filtering.

Figure 7:
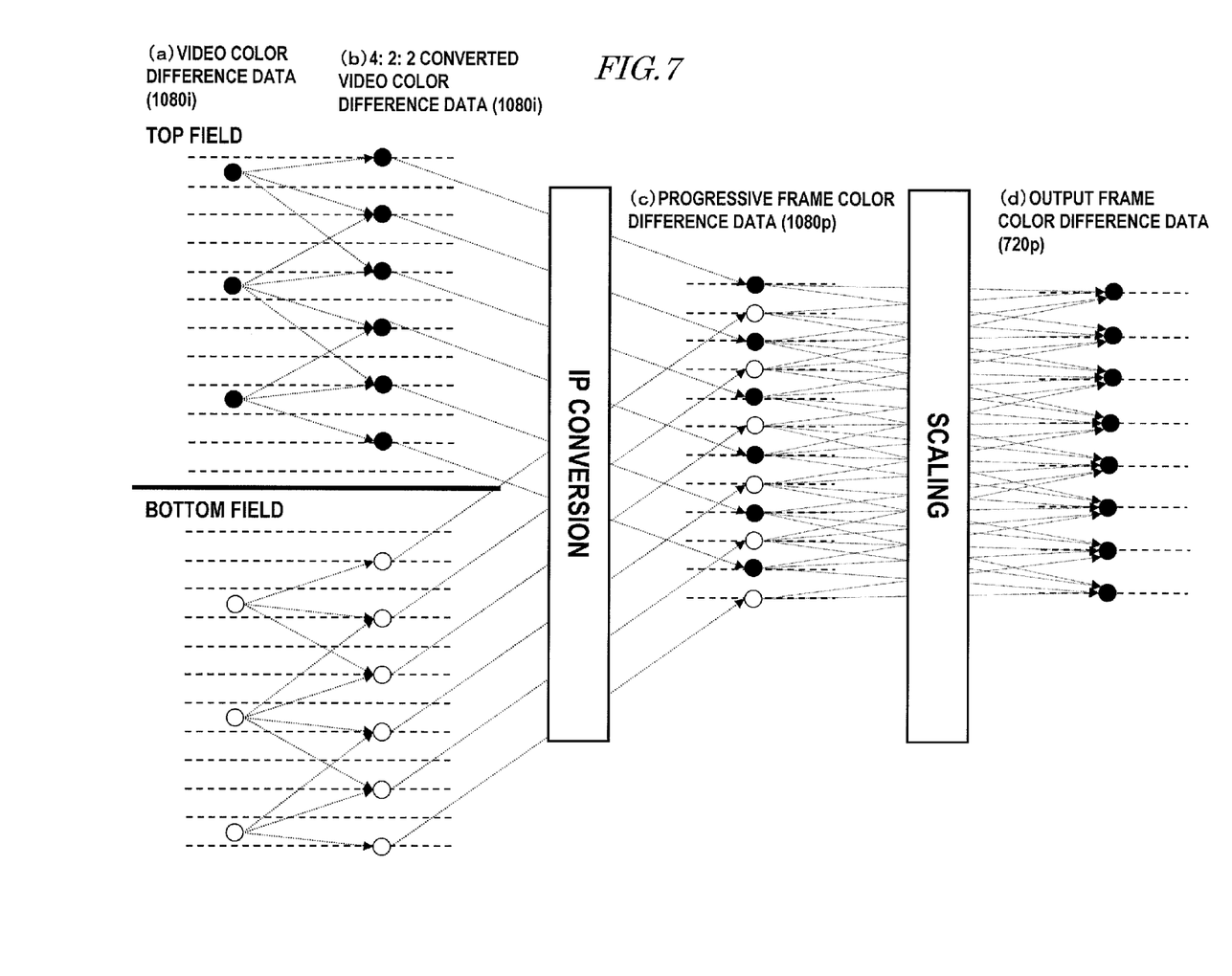

Portions (a) through (d) of FIG. 7 illustrate an example of conventional video processing to be carried out on a synthesized color difference signal. In this example, interlaced video with 1,080 horizontal scan lines (which will be referred to herein as "1080i video") is transformed into, and output as, progressive video with 720 horizontal scan lines (which will be referred to herein as "720p video"). The 1080i video is supposed to be compliant with the 4:2:0 format. In the following description, however, the luminance signal will be neglected. Also, in the following description, to clearly indicate that the video signal is processed on a pixel-by-pixel basis, each pixel value of the color difference signal will be referred to herein as "color difference data".

Specifically, portion (a) of FIG. 7 illustrates top and bottom fields of the 1080i video. In this case, the top field color difference data, which are indicated by the solid circles ●, may form a Cb signal, while the bottom field color difference data, which are indicated by the open circles ○, may form a Cr signal, for example.

Portion (b) of FIG. 7 illustrates 4:2:2 format video signals obtained by subjecting the top-field and bottom-field color difference signals shown in portion (a) of FIG. 7 to vertical filtering. Each of the arrows that connects one of the color difference data (●) shown in portion (a) of FIG. 7 to multiple ones of the color difference data (●) shown in portion (b) of FIG. 7 indicates on which color difference data shown in portion (a) of FIG. 7 the color difference data of each field shown in portion (b) of FIG. 7 has been generated. It can be seen that the amount of information of the color difference signal in each field has been doubled as a result of the vertical filtering.

Such vertical filtering is carried out because if the number of pixels of a color difference signal is equalized with that of pixels of a luminance signal, the IP conversion processing can be carried out more easily after that.

Portion (c) of FIG. 7 illustrates a color difference signal that has been subjected to the IP conversion processing. As a result of the IP conversion processing, the top-field color difference data and the bottom-field color difference data have been integrated together to generate a single frame of color difference data. That is to say, by performing the IP conversion processing, a color difference signal (1080p) representing a progressive frame has been generated. After that, scaling processing (which is also a kind of vertical filtering) is carried out to reduce the number of scan lines to 720.

Portion (d) of FIG. 7 illustrates a frame color difference signal (720p) that has been subjected to the scaling processing. Each of the arrows that connects one of the color difference data shown in portion (c) of FIG. 7 to its associated ones of the color difference data shown in portion (d) of FIG. 7 indicates on which color difference data shown in portion (c) of FIG. 7 each scan line color difference data of the frame shown in portion (d) of FIG. 7 has been generated.

[Prior Art Document]
[Patent Literature]

[Patent Document 1] PCT International Application Japanese National-Phase Laid-Open Patent Publication No. 10-501942

SUMMARY OF INVENTION

Technical Problem

According to the conventional video processing technologies, the color difference signals of demodulated video are subjected to the vertical filtering and converted into 4:2:2 signals before subjected to the OSD synthesis. And after the OSD synthesis, the converted color difference signals are once again subjected to vertical filtering as a sort of scaling processing to obtain the intended output resolution. Each of these two different vertical filtering processes involves generating a single piece of color difference data based on multiple pieces of color difference data. That is why every time such a process is carried out, the frequency characteristic of the signal will deteriorate. For that reason, if the filtering is carried out in two stages, the frequency characteristic of a signal will deteriorate more significantly than a situation where the same data is subjected to the filtering only once. Nowadays, the performance of display devices has improved so significantly that such a deterioration in the frequency characteristic of a signal should be easily sensible as a deterioration in image quality (such as a gradation).

It is therefore an object of the present invention to minimize such deterioration in the frequency characteristic and in gradation of a video signal and an OSD video signal superimposed on the video signal.

Solution to Problem

A video processor according to the present invention superimposes an OSD video signal on a 4:2:0 format video signal. The processor includes: a converting section for converting the OSD video signal into YUV signals; an OSD luminance signal scaling section for performing scaling processing on an OSD luminance signal that is included in the YUV signals; a luminance signal synthesizing section for synthesizing together the OSD luminance signal that has been scaled and the luminance signal of the 4:2:0 format video signal; an OSD color difference signal scaling section for performing scaling processing on OSD color difference signals that are included in the YUV signals; and a color difference signal synthesizing section for synthesizing together the OSD color difference signals that have been scaled and the color difference components of the 4:2:0 format video signal.

The OSD color difference signal scaling section may generate an OSD color difference upscaled signal by changing the scaling factors for the OSD color difference signals according to the sampling phase of the color difference signals of the 4:2:0 format video signal.

The color difference signal synthesizing section may synthesize together the OSD color difference upscaled signal and the color difference components of the 4:2:0 format video signal.

The video processor may further include a color difference signal scaling section for performing scaling processing on the synthesized color difference signals that have been supplied from the color difference signal synthesizing section. If the synthesized color difference signals are interlaced signals, the color difference signal scaling section may convert the synthesized color difference signals into progressive signals, not into the 4:2:2 format.

Advantageous Effect of Invention

According to the present invention, color difference signals in the 4:2:0 format can be scaled directly into the output resolution without causing a significant color difference between the video signal and the OSD video signal. As a result, an output signal can be obtained without deteriorating the frequency characteristic or deteriorating the gradation.

BRIEF DESCRIPTION OF DRAWINGS

Portions (a), (c) and (d) of FIG. 6 illustrate an example of video processing of this preferred embodiment to be performed on color difference signals.

Portions (a) through (d) of FIG. 7 illustrate an example of conventional video processing to be carried out on a synthesized color difference signal.

[Description Of Embodiments]

Hereinafter, preferred embodiments of a video processor according to the present invention will be described with reference to the accompanying drawings. In the following description, the video processor of the present invention is supposed to be a recorder that can record a digital broadcast received. The recorder includes a disc drive section, which is used to record a digital broadcast and play back the digital broadcast recorded. The disc drive section may be loaded with a Blu-ray Disc (BD), for example, and can also play back the content stored on the Blu-ray Disc. The present invention does not have to be carried out as a recorder but may also be implemented as a player, a TV set, a cellphone with a TV receiving function, or a PC that performs the processing to be described later.

Figure 1:
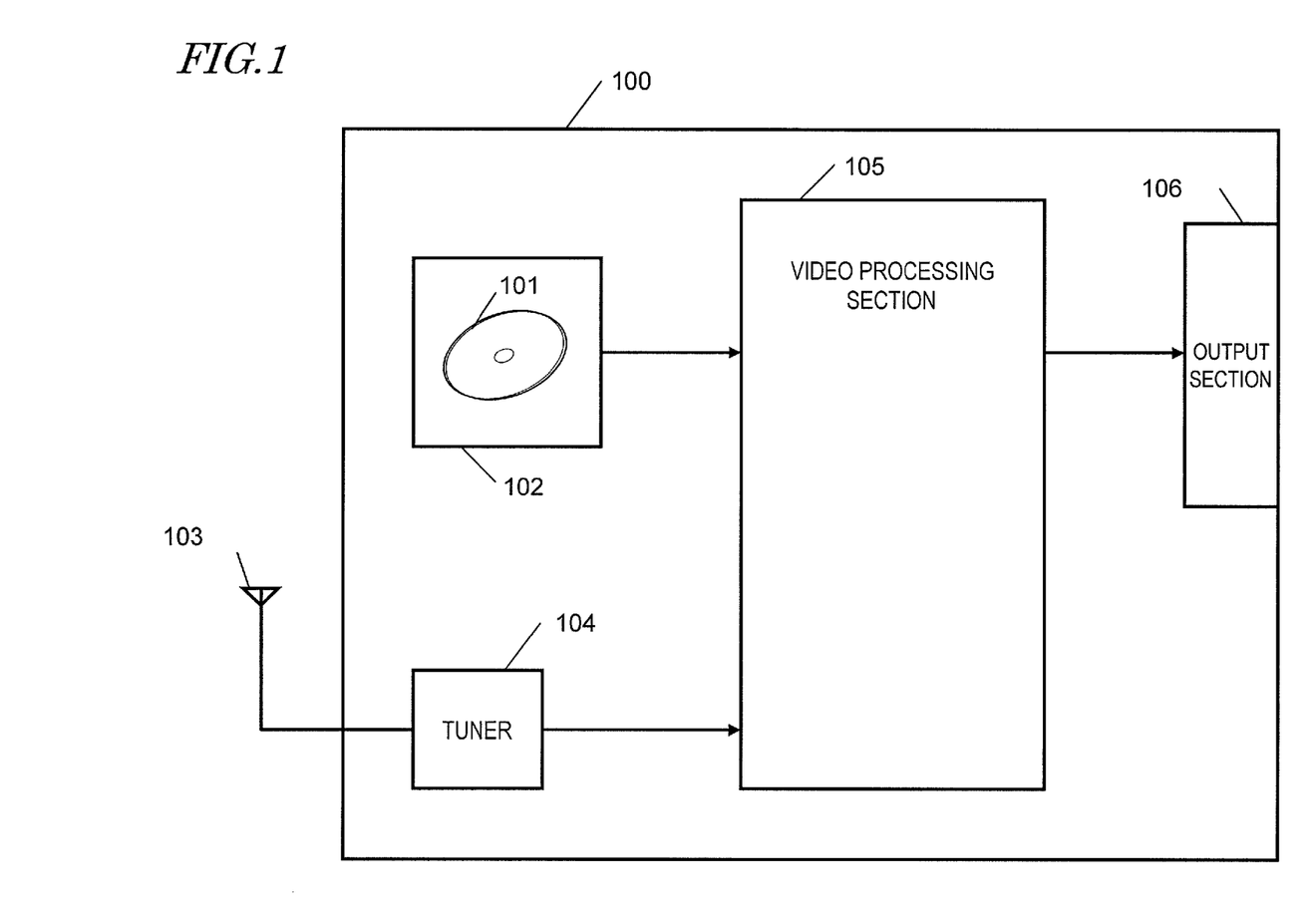
FIG. 1 is a block diagram illustrating a recorder 100 as a preferred embodiment of the present invention.

FIG. 1 is a block diagram illustrating a recorder 100 as a preferred embodiment of the present invention.

The recorder 100 includes a disc drive section 102, an antenna 103, a tuner 104, a video processing section 105 and an output section 106.

The disc drive section 102 retrieves information stored on a disc 101 and outputs a video signal and a digital signal representing graphic data such as subtitles, for example. The disc 101 may be a BD, for example, on which the video signal and the graphic data are stored. It should be noted that the disc 100 is removable from the recorder 100 and does not form part of the recorder 100.

The antenna 103 receives a broadcast wave. The tuner 104 outputs a digital signal representing the broadcast data included in the broadcast wave that has been received at the antenna 103. The video processing section 105 selectively demodulates the incoming digital signal and transforms it into a baseband video signal. It is preferred that the video processing section 105 be implemented as a single chip circuit. The output section 106 converts the baseband video signal, which has been supplied from the video processing section 105, into a signal compliant with the HDMI standard, for example, and then outputs the signal thus obtained.

Hereinafter, the video processing section 105 will be described in further detail with reference to FIG. 2. In the preferred embodiment to be described below, the video signal supplied to the video processing section 105 is supposed to be a 4:2:0 format video signal. The 4:2:0 format has already been described in detail in the background section of this description, and will not be described all over again.

Figure 2:
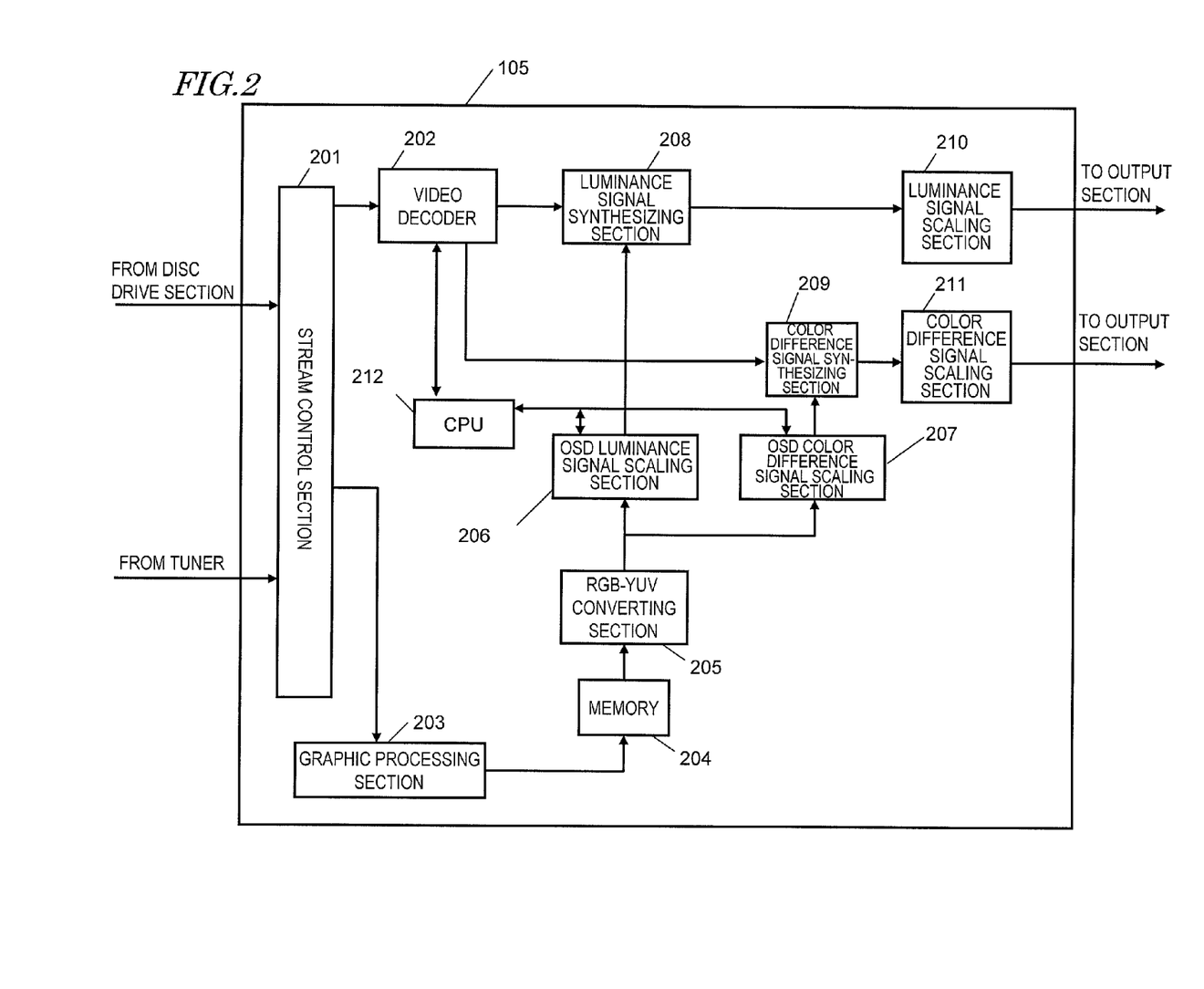
FIG. 2 illustrates a detailed arrangement of functional blocks in the video processing section 105.

FIG. 2 illustrates a detailed arrangement of functional blocks in the video processing section 105, which includes a stream control section 201, a video decoder 202, a graphic processing section 203, a memory 204, an RGB-YUV converting section 205, an OSD luminance signal scaling section 206, an OSD color difference signal scaling section 207, a luminance signal synthesizing section 208, a color difference signal synthesizing section 209, a luminance signal scaling section 210, a color difference signal scaling section 211 and a CPU 212.

The stream control section 201 chooses one of the incoming digital signals as a signal to decode. As used herein, "to choose a signal to decode" means choosing either the signal supplied from the disc drive section 102 or the one supplied from the tuner 104. After that, a video signal corresponding to the chosen signal is output to the video decoder 202. Meanwhile, the graphic data represented by the chosen signal is output to the graphic processing section 203.

The video decoder 202 demodulates the video signal and outputs a luminance signal and color difference signals. In this preferred embodiment, the digital signals entered into the video processing section 105 are 4:2:0 format video signals, and therefore, the amount of information (which is represented by either the number of pixels or the size) of the color difference signals (i.e., Cb and Cr signals) to be demodulated is a half as large as that of the luminance signal (i.e., Y signal) both vertically and horizontally. Also, as far as 4:2:0 format video signals are concerned, the color difference signals will be decoded into data in which the location of each pixel has shifted by 0.5 lines with respect to its counterpart of the luminance signal.

The luminance signal is output from the video decoder 202 to the luminance signal synthesizing section 208. The color difference signals are output from the video decoder 202 to the color difference signal synthesizing section 209.

As already described in the background section, according to the conventional video processing technologies, the color difference signals supplied from the video decoder 202 are subjected to vertical filtering so as to be converted into a 4:2:2 format video signal, and then synthesized.

On the other hand, according to this preferred embodiment, the video decoder 202 outputs the color difference signals as they are (i.e., as the 4:2:0 format video signal) without subjecting them to vertical filtering. Since there is no need to perform the vertical filtering that should be done according to the conventional technologies, an output signal can be obtained without deteriorating the frequency characteristic or deteriorating the gradation. In this case, the video decoder 202 may insert dummy data (as null data) to equalize the number of vertical pixels with that of the luminance signal and transmit them easily.

This processing can get done in the following manner. Specifically, with the values of the pixel data of the incoming color difference signals (i.e., color difference data) kept as they are, the same color difference data values are duplicated vertically (i.e., output repeatedly), thereby equalizing the number of vertical pixels of the color difference signals with that of the luminance signal. In that case, when attention is paid to the valid color difference data, the location of each vertical pixel of the color difference signals has shifted by 0.5 lines with respect to that of its associated pixel of the luminance signal. On the other hand, since the location of each vertical pixel of the null data is quite apart from that of its counterpart of the luminance signal, the null data will never be used again in the rest of the processing.

The graphic processing section 203 receives either script data or compressed graphic data from the stream control section 201. In accordance with a rendering instruction included in the script data received, the graphic processing section 203 renders a graphic image representing subtitles, for example, in the memory 204 as an OSD plane video signal (which will be referred to herein as an "OSD video signal"). The OSD video signal is represented in the RGB color space. That is to say, the luminance signal (Y) and the Cb and Cr signals all have the same amount of information.

The RGB-YUV converting section 205 converts the OSD data consisting of RGB values, which have been rendered on the memory 204, into a luminance signal and color difference signals. It should be noted that since the signals yet to be entered into the RGB-YUV converting section 205 are RGB signals, the output signal of the RGB-YUV converting section 205 will be a 4:4:4 format video signal.

The luminance signal is output from the RGB-YUV converting section 205 to the OSD luminance signal scaling section 206. In the same way, the color difference signals are output from the RGB-YUV converting section 205 to the OSD color difference signal scaling section 207.

The CPU 212 gets information about the number of pixels of the video signal that has been output from the video decoder 202 and also gets information about the number of pixels of the OSD video signal that has been output from the RGB-YUV converting section 205.

The information about the number of pixels may be included either as header information in the digital signal supplied from the tuner 104 or as management information on the disc 101.

And the CPU 212 outputs a signal for controlling the rate of scaling to the OSD luminance signal scaling section 206 and the OSD color difference signal scaling section 207.

Hereinafter, it will be described how to control the rate of scaling. Suppose a situation where the number of pixels of the output video signal of the video decoder 202 is twice as large as that of the OSD video signal supplied from the RGB-YUV converting section 205. In that case, the number of pixels of the luminance signal of the video signal supplied from the video decoder 202 is also twice as large as that of the luminance signal of the OSD video signal supplied from the RGB-YUV converting section 205. That is why the OSD luminance signal scaling section 206 controls the rate of scaling so as to double the number of pixels.

On the other hand, the number of pixels of the color difference signals of the output video signal of the video decoder 202 is equal to that of the color difference signals of the output OSD video signal of the RGB-YUV converting section 205. Following is the reason. Specifically, since the video signal is output from the video decoder 202 in the 4:2:0 format, the number of pixels of its color difference signals is half as large as that of its luminance signal. On the other hand, since the video signal is output from the RGB-YUV converting section 205 in the 4:4:4 format, the number of pixels of its color difference signals is equal to that of its luminance signal. And the number of pixels of the output video signal of the video decoder 202 is supposed to be twice as large as that of the output OSD video signal of the RGB-YUV converting section 205. Consequently, such a relation is satisfied.

As a result, the OSD color difference signal scaling section 207 controls the rate of scaling so as not to change the numbers of pixels (i.e., to keep the number of pixels as large as always).

In another example, if the number of pixels of the output video signal of the video decoder 202 is four times as large as that of the output OSD video signal of the RGB-YUV converting section 205, the rate of scaling increases fourfold at the OSD luminance signal scaling section 206 and doubles at the OSD color difference signal scaling section 207.

In the following description, the number of pixels of the output video signal of the video decoder 202 is supposed to be twice as large as that of the output OSD video signal of the RGB-YUV converting section 205 as in the first example.

The luminance signal synthesizing section 208 synthesizes together the respective luminance signals of the output video signal of the video decoder 202 and the output OSD video signal. The number of pixels and the pixel locations of the luminance signal of the OSD video signal have been processed by the OSD luminance signal scaling section 206 to be equal to those of the luminance signal of output video signal of the video decoder 202. The luminance signal scaling section 210 scales the synthetic luminance signal to an output resolution and then outputs the luminance signal that has been scaled.

The color difference signal synthesizing section 209 synthesizes together the respective color difference signals of the output video signal of the video decoder 202 and the output OSD video signal. The number of pixels and the pixel locations of the color difference signals of the OSD video signal have been processed by the OSD color difference signal scaling section 207 to be equal to those of the color difference signals of output video signal of the video decoder 202.

The color difference signal scaling section 211 scales the synthetic color difference signals to an output resolution and then outputs them. More specifically, the color difference signal scaling section 211 extracts effective data from the synthetic color difference signals and then performs scaling on the synthetic color difference signals so that the color difference signals have their output resolution equalized with respect to pixel locations in the 4:2:0 format.

Hereinafter, it will be described with reference to FIGS. 3 and 4 how the CPU 212 controls the OSD luminance signal scaling section 206 and the OSD color difference signal scaling section 207. The conventional method shown in FIG. 3 will be described first, and then the method of this preferred embodiment shown in FIG. 4 will be described. In the following example, the video signal decoded by the video decoder 202 is supposed to be a group of progressive image frames. Also, in the following example, to clearly indicate that the video signal is processed on a pixel-by-pixel basis, the values of respective pixels of the luminance signal and the color difference signals will be referred to herein as "luminance data" and "color difference data".

Figure 3:
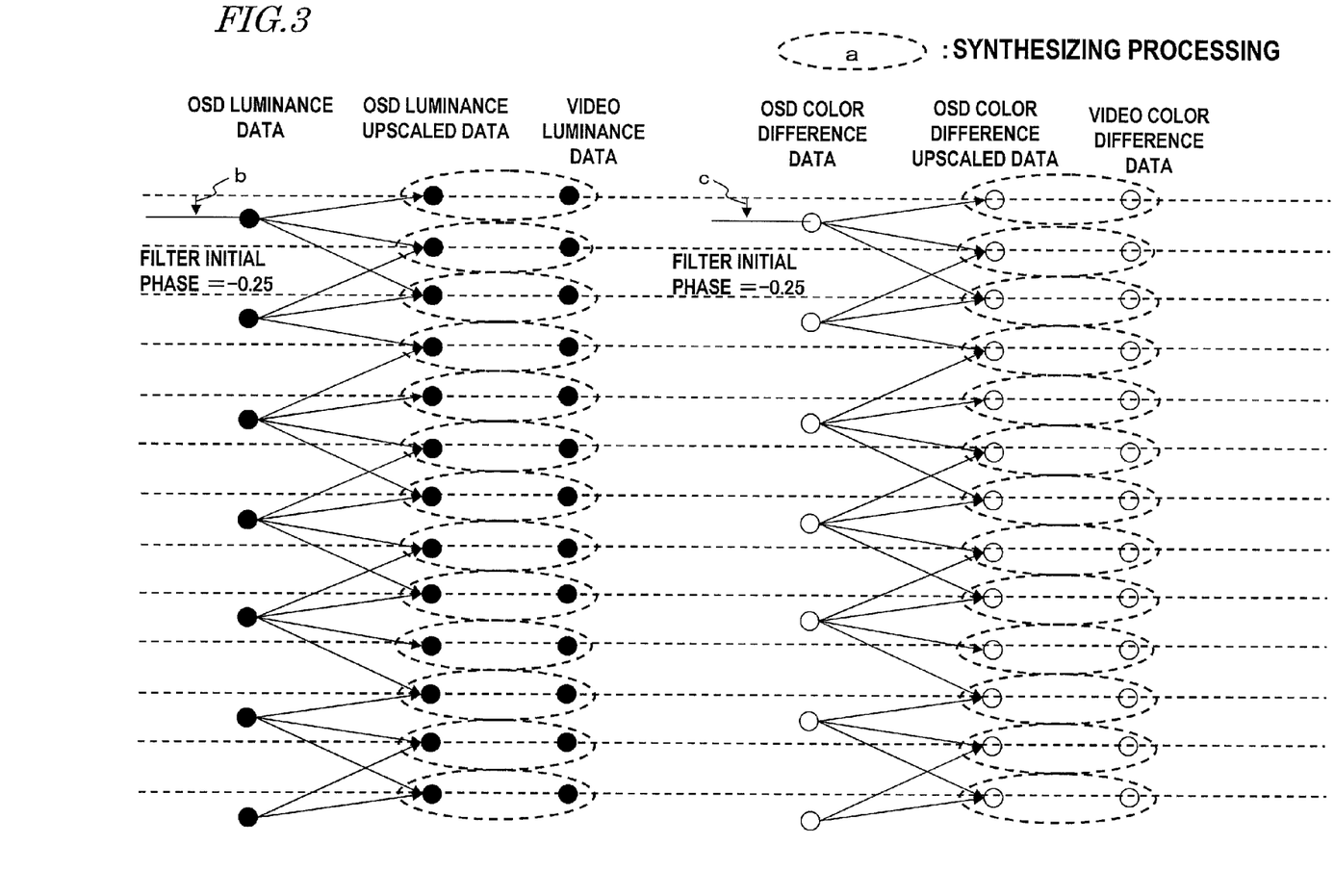
FIG. 3 illustrates a conventional method of performing synthesizing processing.

FIG. 3 illustrates a conventional method of performing synthesizing processing. A half of FIG. 3 on the left-hand side of the paper (where the respective items of data are indicated by the solid circles ●) shows how luminance data is processed, while the other half of FIG. 3 on the right-hand side of the paper (where the respective items of data are indicated by the open circles ○) shows how color difference data is processed. A number of parallel dashed lines shown in FIG. 3 indicate the vertical locations of pixels of the luminance data of the video signal. In FIG. 3, it is shown side by side how the luminance data is processed and how the color difference data is processed. However, this is done just for convenience sake and the same can be said about FIG. 4 to be referred to later, too.

This is a control method to be carried out by the CPU 212 in order to generate a video signal in the 4:2:2 format by synthesizing together a video signal and an upscaled version of the OSD signal, of which the size is a half as large as that of the video signal. FIG. 3 shows the conventional control method. However, as will be described later, a device according to a modified example of this preferred embodiment can operate while changing the modes of processing from the one shown in FIG. 3 into the one shown in FIG. 4, or vice versa. That is why the video processing section 105 of this preferred embodiment shown in FIG. 2 can operate even if the conventional control method is adopted.

In this example, each pair of pixels to be synthesized together by either the luminance signal synthesizing section 208 or the color difference signal synthesizing section 209 is surrounded with a dashed ellipse a. Also shown in FIG. 3 is a parameter b indicating the phase difference of the first data (i.e., the OSD luminance upscaled data) of the filter output with respect to the data (i.e., the "OSD luminance data" in this case) to be entered into the filter of the OSD luminance signal scaling section 206. In the following description, such a parameter will be referred to herein as a "filter initial phase". The delay caused by such a filter initial phase of 0.25 is equal to a delay corresponding to 0.5 lines. Further shown in FIG. 3 is the filter initial phase c in a situation where the OSD color difference data is filtered and then scaled up by the OSD color difference signal scaling section 207.

Unlike the method of this preferred embodiment, the video signal is converted according to the conventional method from the 4:2:0 format into the 4:2:2 format and then synthesized with the OSD video signal. When the video signal is converted into a 4:2:2 format video signal and when the color difference signals of the video signal are subjected to vertical filtering in the video decoder 202, the vertical pixel locations of the luminance signal of the video signal can be aligned with those of the color difference signals thereof.

Also, with respect to the output data of the video decoder 202, the output OSD data of the RGB-YUV converting section 205 has a phase difference (i.e., filter initial phase) of 0.25 and also has a half as large a number of pixels. In that case, interpolation needs to be carried out with the phase of the OSD data shifted and matched to the output of the video decoder 202. For example, the OSD luminance data has a phase lag of 0.25 with respect to the video luminance data and also has a half as large a number of pixels as the video luminance data. That is why the CPU 212 makes interpolation so that when the interpolation is done, the OSD luminance upscaled data and the video luminance signal will have their phases matched to each other and will also have the same number of pixels. The same can be said about the color difference signals.

In that case, the OSD luminance signal scaling section 206 and the OSD color difference signal scaling section 207 have the same scaling factor at the filter (i.e., the same filter initial phase). That is to say, b==c==−0.25.

In the example described above, the filter initial phase is supposed to be −0.25. However, even if the filter initial phase has any other value, interpolation may be carried out in a similar manner so as to match the OSD signal to the video signal.

Figure 4:
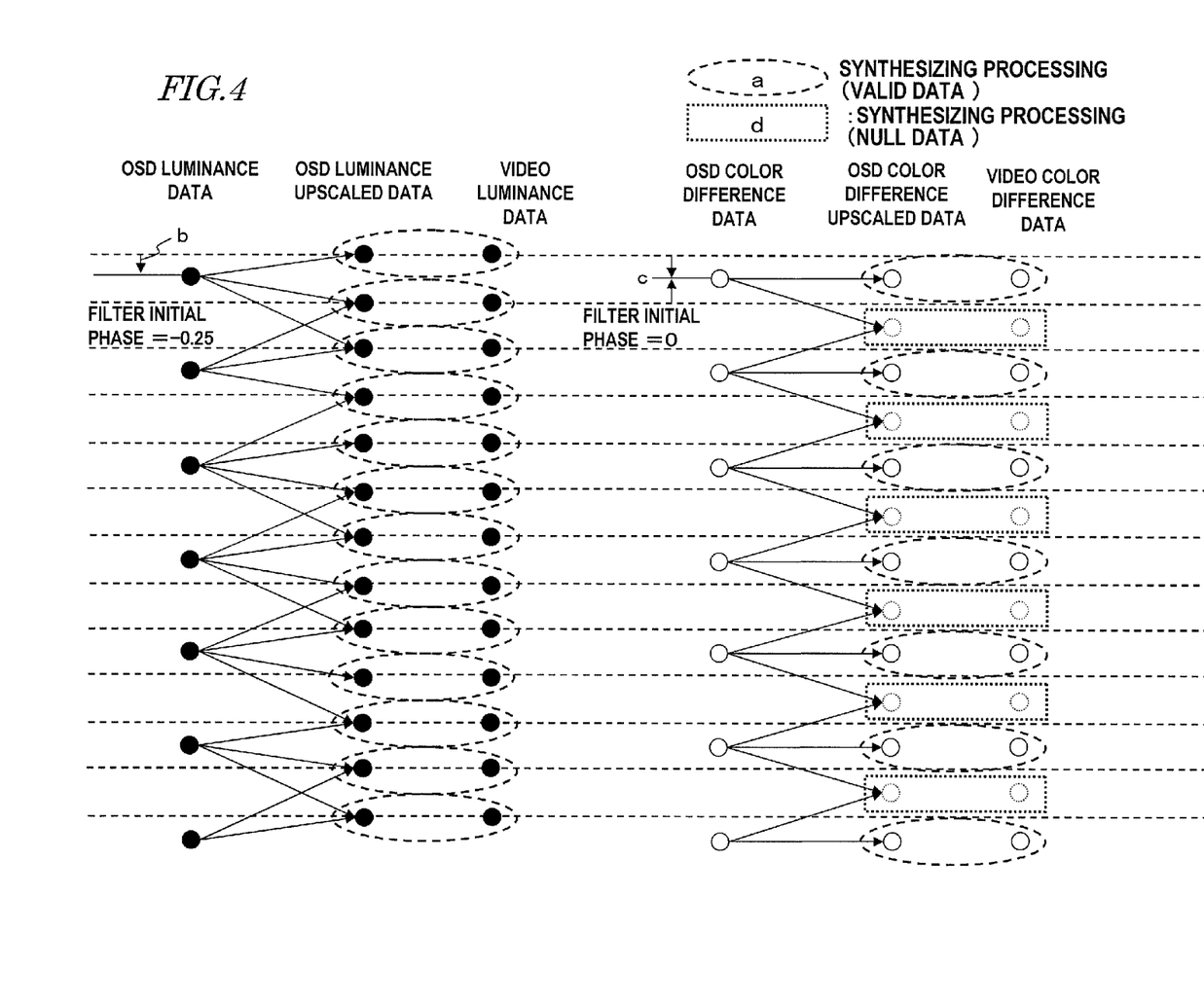
FIG. 4 shows how to perform the synthesizing processing according to this preferred embodiment.

FIG. 4 shows how to perform the synthesizing processing according to this preferred embodiment. A half of FIG. 4 on the left-hand side of the paper (where the respective items of data are indicated by the solid circles ●) shows how luminance data is processed, while the other half of FIG. 4 on the right-hand side of the paper (where the respective items of data are indicated by the open circles ○) shows how color difference data is processed. This is a control method to be carried out by the CPU 212 in order to generate a video signal in the 4:2:0 format by synthesizing together a video signal and an upscaled version of the OSD signal, of which the size is a half as large as that of the video signal. In FIG. 4, each pair of pixels to be synthesized together by the color difference signal synthesizing section 209 when null data is inserted by the video decoder 202 is surrounded with a dashed rectangle d. Looking at the OSD color difference upscaled data in the valid data surrounded with the dashed ellipse a, it can be seen that each OSD color difference upscaled data has been generated from a single piece of OSD color difference data. Since the OSD color difference data at no other pixel location is used, the image quality does not deteriorate easily.

According to this preferred embodiment, the video signal has the 4:2:0 format, and therefore, the video color difference data has a phase lag of 0.25 with respect to the video luminance data. On the other hand, as for the output OSD video signal of the RGB-YUV converting section 205, the OSD color difference data is supposed to have a phase lag of 0.25 with respect to the OSD luminance data. In that case, although the phases of the OSD luminance data and the video luminance data will shift from each other, the phases of the OSD color difference data and the video color difference data will match to each other. That is why if the scaling factor for the OSD color difference data is 1× as in this preferred embodiment, the OSD color difference data may be just synthesized without performing any special kind of data processing such as interpolation. Consequently, the frequency information that the OSD color difference data essentially has will never be lost because no special kind of data processing such as interpolation needs to be carried out.

In the synthetic color difference signals output from the color difference signal synthesizing section 209, pixels on which no OSD video signal is superimposed remain as they were in the color difference signals of the output video signal of the video decoder 202. In that case, if the color difference signal scaling section 211 scales the synthetic color difference signals to the output resolution with respect to the pixel locations of the 4:2:0 format with the null data discarded, scaling can be done with the deterioration in frequency characteristic and in gradation minimized.

On top of that, in the synthetic color difference signals output from the color difference signal synthesizing section 209, pixels on which the OSD video signal is superimposed have already been shifted to their expected pixel locations in the 4:2:0 format, and therefore, no color difference should be caused between the video signal and the OSD video signal. Particularly, in a situation where the graphics are supposed to have a half as high a vertical resolution as the video as in a digital broadcast here in Japan, the OSD signal is not subjected to the vertical filtering according to the synthesizing processing method of this preferred embodiment. This is because since the initial phase is zero and the signals are supposed to be scaled up by 2×, the valid data every other line will always have a phase difference of zero and no vertical filtering is needed at all. As a result, the frequency characteristic of the OSD video signal also improves.

In the preferred embodiment described above, the video decoder 202 is supposed to insert null data. Alternatively, the output may be suspended during a null data period so that the dashed rectangles d shown in FIG. 4 (i.e., combinations of pixels to be synthesized together by the color difference signal synthesizing section 209) are not present even when the null data is inserted.

Also, in the preferred embodiment described above, the video processing section 105 is supposed to always perform the synthesizing processing shown in FIG. 4. However, the video processing section 105 may also perform the control operation while changing the modes of synthesizing processing between the ones shown in FIGS. 3 and 4 according to a variation in the resolution of the OSD image, for example.

Furthermore, with the configuration described above adopted, the color difference signals are converted into the 4:2:2 format, and then bit precision is adjusted to the luminance signal that is not subjected to filtering at all. That is why the deterioration in the gradation of the color difference signals, which would otherwise be caused when less significant bits generated by computations are rounded, can be reduced significantly. On top of that, even if the pixel locations of the luminance and color difference signals of a 4:2:0 format signal shift vertically by 0.5 lines when an OSD video signal is directly synthesized with the 4:2:0 format signal, the color difference between the video signal and the OSD video signal can also be reduced significantly.

Figure 5:
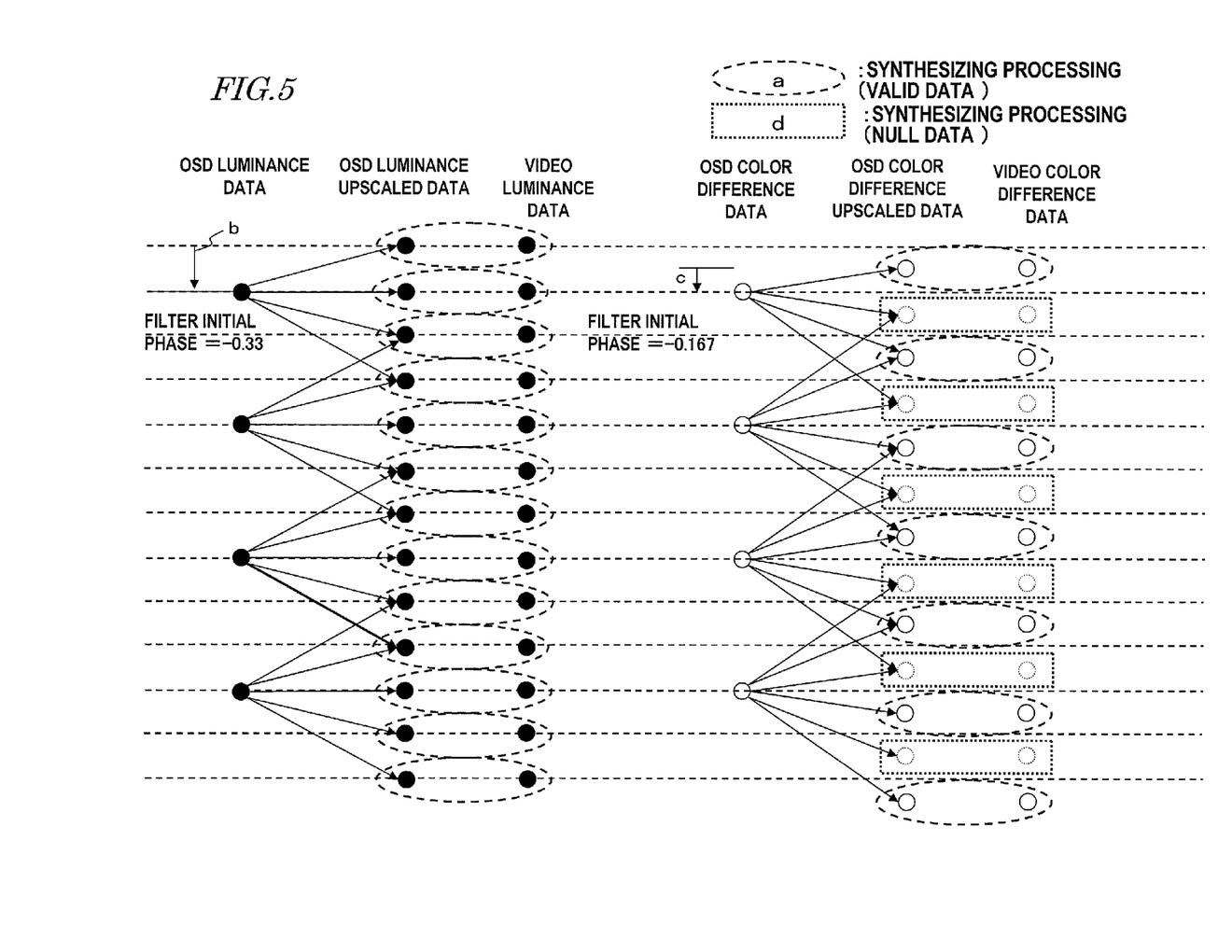
FIG. 5 illustrates an example in which an OSD video signal is scaled up by 3×.

In the example that has already been described with reference to FIG. 4, the OSD video signal is supposed to be scaled up by 2×. However, the scaling factor can be changed appropriately. For example, FIG. 5 illustrates an example in which an OSD video signal is scaled up by 3×. It can be seen that the amount of information of the OSD signal has been tripled. It should be noted that the filter initial phase also changes according to the scaling factor.

Next, it will be described how the luminance signal scaling section 210 and the color difference signal scaling section 211 perform an IP conversion after the synthesizing processing described above has been done. In the following description, the processing to get done by the color difference signal scaling section 211 will be described as an example. However, similar processing is also performed by the luminance signal scaling section 210.

Figure 6:
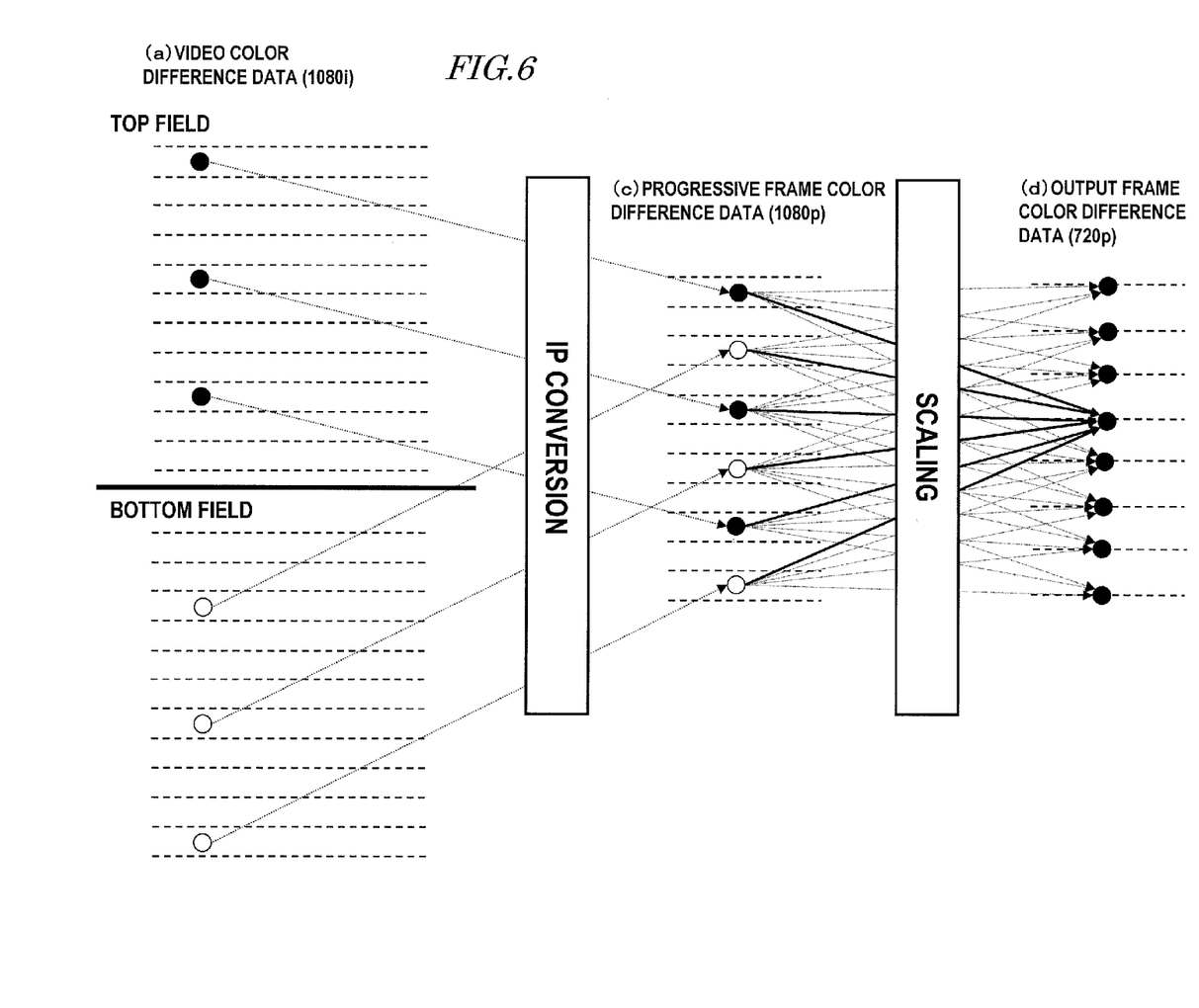

Portions (a), (b) and (c) of FIG. 6 illustrate an example of video processing of this preferred embodiment to be performed on color difference signals. In the following example, it will be described how to convert interlaced video with 1,080 horizontal scan lines (which will be referred to herein as "1080i video") in the 4:2:0 format into progressive video with 720 horizontal scan lines (which will be referred to herein as "720p video") and output it.

As shown in portion (a) of FIG. 6, the color difference signal scaling section 211 receives the color difference data (i.e., valid data), including video color difference data and OSD color difference upscaled data that are encircled within the dashed ellipse, as shown on a half of FIG. 4 illustrated on the right-hand side of the paper. And that data is further supplied separately to the top field and the bottom field.

Portion (c) of FIG. 6 illustrates a color difference signal that has been subjected to the IP conversion processing, through which progressive frame color difference signals (1080p) have been generated.

Portion (d) of FIG. 6 illustrates scaled frame color difference signals (720p). Each of the arrows that connects one of the color difference data shown in portion (c) of FIG. 6 to an associated one of the color difference data shown in portion (d) of FIG. 7 indicates on which color difference data shown in portion (c) of FIG. 6 the color difference data on each scan line of the frame shown in portion (d) of FIG. 6 has been generated.

Comparing FIG. 6 to FIG. 7, it can be seen that no vertical filtering shown in portion (b) of FIG. 7 is performed in FIG. 6. Since there is no need to perform the conventional vertical filtering, an output signal can be obtained without deteriorating the frequency characteristic or deteriorating the gradation.

According to this preferred embodiment, there is no need to perform the vertical filtering shown in portion (b) of FIG. 7 because the video processing section 105 is implemented as a single chip circuit and does not have to satisfy the constraints that are imposed on the specification of the conventional IP conversion processing. In the conventional configuration, a chip circuit for performing the IP conversion processing (which will be referred to herein as an "IP conversion processor") is usually provided in a player. The IP conversion processor is available as a separate part, and many manufacturers of players often introduce the IP conversion processor into their own products. To make the processor a general-purpose one, the specification of a video signal to be entered into the IP conversion processor is defined in advance. For example, the input video signal is defined in advance to be a 1080i signal in the 4:2:2 format. To comply with this specification, according to a conventional technique, the 4:2:0 format shown in portion (b) of FIG. 7 needs to be converted into the 4:2:2 format.

On the other hand, according to this preferred embodiment, the video processing section 105 is implemented as a single chip circuit, and therefore, does not have to satisfy the constraints imposed on the specification of the IP conversion processor. When such a configuration is adopted, an additional cost for developing such a single chip circuit certainly has to be paid but there is no need to satisfy the constraints imposed on the conventional specification anymore. As a result, the vertical filtering that would affect the image quality (see shown in portion (b) of FIG. 7) no longer needs to be performed.

Industrial Applicability

The present invention can be used effectively in a digital TV set, a digital recorder or any other electronic device that demodulates a 4:2:0 format video signal and displays it with graphic data superimposed on it. And the present invention is beneficial because this invention would contribute greatly to providing as good a playback environment as possible.

Reference Signs List 100 video processor
101 disc
102 disc drive section
103 antenna
104 tuner
105 video processing section
106 output section
201 stream control section
202 video decoder
203 graphic processing section
204 memory
205 RGB-YUV converting section
206 OSD luminance signal scaling section
207 OSD color difference signal scaling section
208 luminance signal synthesizing section
209 color difference signal synthesizing section
210 luminance signal scaling section
211 color difference signal scaling section
212 CPU

The invention claimed is:

1. A video processor for superimposing an OSD video signal on a 4:2:0 format video signal, the processor comprising:
 a converting section configured to convert the OSD video signal into YUV signals;
 an OSD luminance signal scaling section configured to perform scaling processing on an OSD luminance signal that is included in the YUV signals;
 a luminance signal synthesizing section configured to synthesize together the OSD luminance signal that has been scaled and the luminance signal of the 4:2:0 format video signal;
 an OSD color difference signal scaling section configured to perform scaling processing on OSD color difference signals that are included in the YUV signals; and
 a color difference signal synthesizing section configured to synthesize together the OSD color difference signals that have been scaled and the color difference components of the 4:2:0 format video signal.

2. The video processor of claim 1, wherein the OSD color difference signal scaling section generates an OSD color difference upscaled signal by changing the scaling factors for the OSD color difference signals according to the sampling phase of the color difference signals of the 4:2:0 format video signal.

3. The video processor of claim 2, wherein the color difference signal synthesizing section synthesizes together the OSD color difference upscaled signal and the color difference components of the 4:2:0 format video signal.

4. The video processor of claim 1, further comprising a color difference signal scaling section configured to perform scaling processing on the synthesized color difference signals that have been supplied from the color difference signal synthesizing section,
 wherein if the synthesized color difference signals are interlaced signals, the color difference signal scaling section converts the synthesized color difference signals into progressive signals, not into the 4:2:2 format.

* * * * *